United States Patent
Luo et al.

(10) Patent No.: US 7,283,901 B2
(45) Date of Patent: Oct. 16, 2007

(54) CONTROLLER SYSTEM FOR A VEHICLE OCCUPANT PROTECTION DEVICE

(75) Inventors: Yun Luo, Livonia, MI (US); Jon K. Wallace, Redford, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 180 days.

(21) Appl. No.: 11/035,146

(22) Filed: Jan. 13, 2005

(65) Prior Publication Data

US 2006/0155442 A1 Jul. 13, 2006

(51) Int. Cl.
*B60R 22/32* (2006.01)
*B60R 21/01* (2006.01)

(52) U.S. Cl. .......................... 701/45; 701/36; 180/271; 340/438; 280/734

(58) Field of Classification Search ............ 701/45–47, 701/36; 180/271; 280/728.1, 734–735; 307/9.1; 340/425.5, 438
See application file for complete search history.

(56) References Cited

U.S. PATENT DOCUMENTS

| | | | |
|---|---|---|---|
| 6,198,998 B1 | 3/2001 | Farmer et al. | |
| 6,459,974 B1 | 10/2002 | Baloch et al. | |
| 6,493,620 B2 | 12/2002 | Zhang | |
| 6,501,536 B1 | 12/2002 | Fredricks | |
| 6,608,910 B1 | 8/2003 | Srinivasa et al. | |
| 6,772,057 B2 | 8/2004 | Breed et al. | |
| 6,810,133 B2 * | 10/2004 | Khairallah et al. | 382/104 |
| 7,147,246 B2 * | 12/2006 | Breed et al. | 280/735 |
| 7,164,117 B2 * | 1/2007 | Breed et al. | 250/221 |
| 2002/0181743 A1 * | 12/2002 | Khairallah et al. | 382/104 |
| 2003/0016845 A1 | 1/2003 | Farmer | |
| 2003/0031345 A1 | 2/2003 | Farmer | |

(Continued)

FOREIGN PATENT DOCUMENTS

EP 0 885 782 A1 12/1998

(Continued)

OTHER PUBLICATIONS

Michel Devy et al., "Detection and Classification of Passenger Seat Occupancy Using Stereovision", Oct. 3, 2000, *Intelligent Vehicles Symposium*, 2000. IV 2000. Proceedings of the IEE Dearborn, MI, U.S.A., Oct. 3-5, 2000, Piscataway, NJ, USA, IEEE, US, pp. 714-719, XP-010529022, ISBN: 0-7803-6363-9.

(Continued)

*Primary Examiner*—Y. Beaulieu
(74) *Attorney, Agent, or Firm*—Tarolli, Sundheim, Covell & Tummino LLP

(57) ABSTRACT

Systems and methods are provided for identifying a position of a head of a vehicle occupant from a plurality of images of a vehicle interior. Image data is translated from the plurality of images to produce a virtual side view image of the vehicle interior (162). A largest grouping of pixels in the side view image having values within a desired range is identified (164). The grouping includes a plurality of pixel columns. A contour including uppermost pixels of each pixel column is produced and peaks are located within the contour (166). The contour peaks are analyzed according to a heuristic voting algorithm to identify a peak location associated with the head of the vehicle occupant (172).

12 Claims, 5 Drawing Sheets

U.S. PATENT DOCUMENTS

| | | |
|---|---|---|
| 2004/0021305 A1 | 2/2004 | Takagi et al. |
| 2004/0085448 A1* | 5/2004 | Goto et al. .................. 348/148 |
| 2004/0109154 A1* | 6/2004 | Wallace et al. ............ 356/4.03 |
| 2006/0140446 A1* | 6/2006 | Luo et al. ................... 382/104 |

FOREIGN PATENT DOCUMENTS

| | | |
|---|---|---|
| EP | 1 482 448 A2 | 12/2004 |
| WO | WO 01/96147 A2 | 12/2001 |

OTHER PUBLICATIONS

S. Gautama et al., "Evaluation of Stereo Matching Algorithms for Occupant Detection", *Recognition, Analysis, and Tracking of Faces and Gestures in Real-Time Systems*, 1999. Proceedings. International Workshop on Corfu, Greece Sep. 26-27, 1999, pp. 177-184, XP-010356544, ISBN: 0-7695-0378-0.

* cited by examiner

CONTROLLER SYSTEM FOR A VEHICLE OCCUPANT PROTECTION DEVICE

TECHNICAL FIELD

The present invention is directed generally to machine vision systems and is particularly directed to a method and apparatus for locating an object within an image. The present invention is particularly useful in occupant restraint systems for object and/or occupant classification and tracking.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Many smart actuatable restraint systems rely on machine vision systems and pattern recognition systems to locate the position of an occupant's head. An occupant's head can be identified within an image of the vehicle interior and its position within the vehicle can be determined according to the known positions and orientations of one or more cameras. The actuation of the restraint system can be controlled in response to the determined head position as to increase the effectiveness of the actuatable restraint system.

SUMMARY OF THE INVENTION

In accordance with one aspect of the present invention, a system is provided for identifying a position of a head of a vehicle occupant from a plurality of images of a vehicle interior. Image data is translated from the plurality of images to produce a virtual side view image of the vehicle interior. A largest grouping of pixels in the side view image having values within a desired range is identified. The grouping includes a plurality of pixel columns. A contour comprising uppermost pixels of each pixel column is produced and peaks are located within the contour. The contour peaks are analyzed according to a heuristic voting algorithm to identify a peak location associated with the head of the vehicle occupant.

In accordance with another aspect of the present invention, a method is provided for controlling an actuatable occupant protection system. An image generator generates at least two images of a vehicle occupant. A virtual image generator produces a virtual side view image of the vehicle occupant from the generated image. A blob finder selects a largest grouping of pixels in the virtual side view image. A peak identifier locates a plurality of peaks along the uppermost contour of the selected grouping of pixels. An arbitrator selects one of the plurality of peaks according to determined characteristics of the peak.

In accordance with yet another aspect of the present invention, a computer program product, implemented in a computer readable medium and operative in a data processing system, is provided for editing an image of a vehicle interior to isolate the occupant of a vehicle seat. A contour generator produces a contour image from one or more generated images. A model selector selects a contour model from a plurality of contour models according to the contour image and an associated selection algorithm. An image editor edits the generated image to remove a portion of the image representing the vehicle seat according to the selected contour model.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
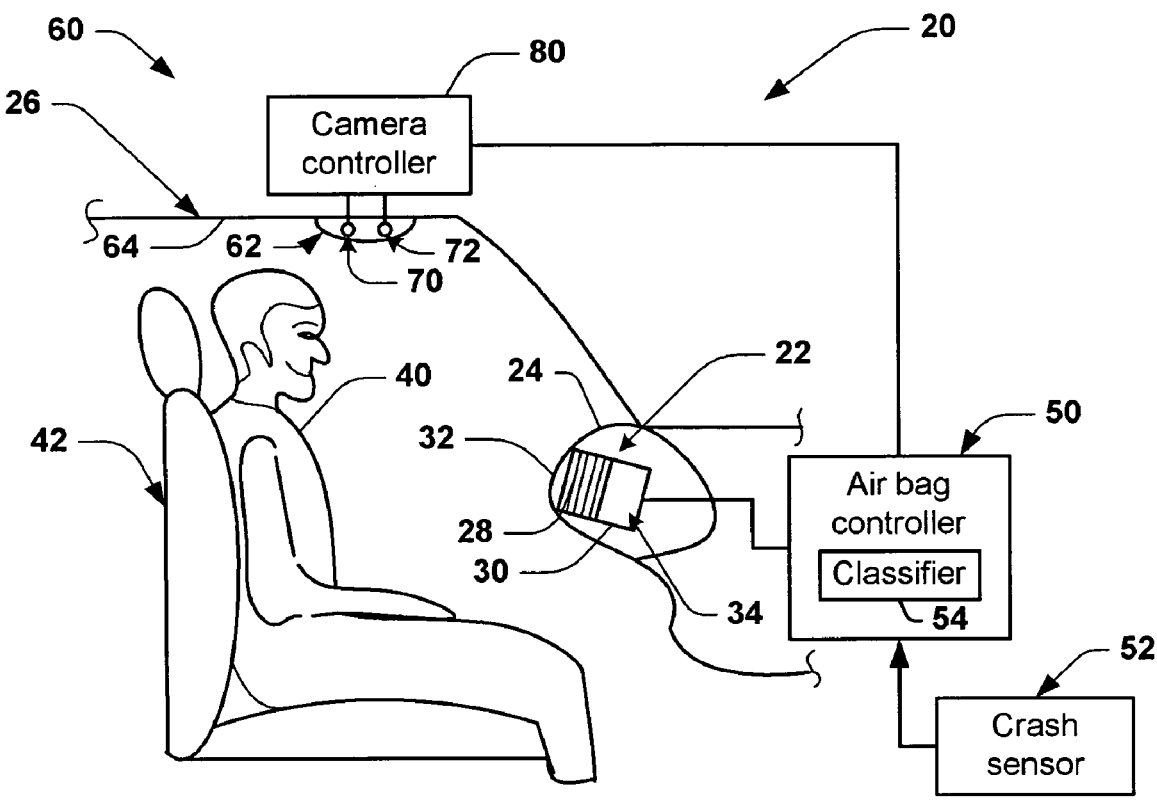
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, (e.g., timing, gas flow, bag profile as a function of time, gas pressure, etc.). Once inflated, the air bag 28 may help protect an occupant 40, such as a vehicle passenger, sitting on a vehicle seat 42. Although the embodiment of FIG. 1 is described with regard to a vehicle passenger seat, it is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring (i.e., an event for which it may be desirable to deploy the air bag 28). There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, (e.g., timing, gas flow rate, gas pressure, bag profile as a function of time, etc.).

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. The air bag control algorithm associated with the controller 50 can be made sensitive to the provided image data. For example, if the provided image data indicates that the occupant 40 is an object, such as a shopping bag, and not a human being, actuating the air bag during a crash event serves no purpose. Accordingly, the air bag controller 50 can include a pattern recognition classifier assembly 54 operative to distinguish between a plurality of occupant classes based on the image data provided by the camera controller 80 that can then, in turn, be used to control the air bag.

Figure 2:
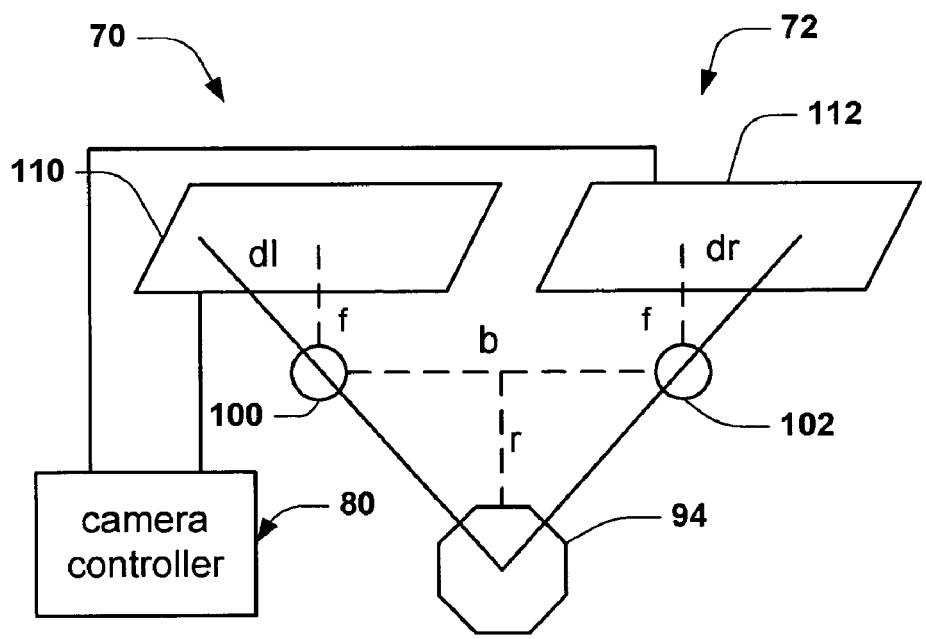
FIG. 2 is a schematic illustration of a stereo camera arrangement for use with the present invention.

FIG. 2 is a schematic illustration of the cameras 70 and 72 of the imaging device 61. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment 31 of the vehicle 26. In one exemplary embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment 31 due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object 94 formed on the pixel array 112 of camera 72. The distance between the viewpoints of the cameras 70 and 72 (i.e., the distance between the lenses 100 and 102), is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r=bf/d, \text{ where } d=dl-dr. \qquad \text{(Equation 1)}$$

From equation 1, the distance r to the object 94 as a function of disparity of the images from cameras 70 and 72 can be determined. It should be appreciated that the distance r is an inverse function of disparity.

Figure 3:
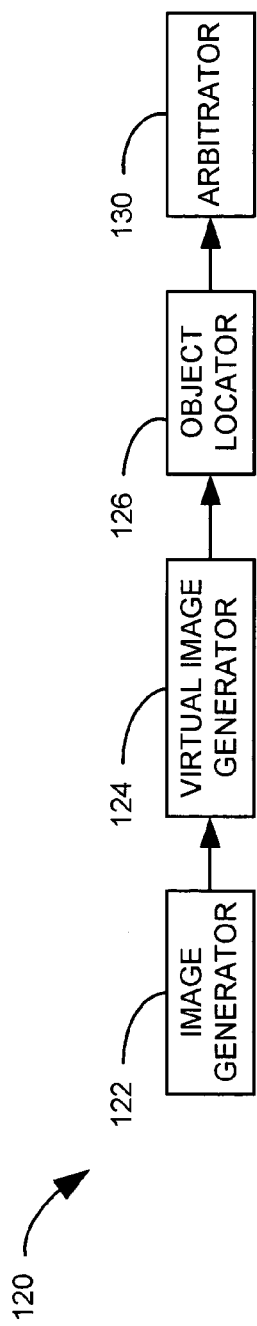
FIG. 3 illustrates a head location system in accordance with an aspect of the present invention.

Referring to FIG. 3, an object location system 120 in accordance with an aspect of the present invention is shown. It will be appreciated that one or more portions of the system 120 can be implemented as computer software on a general purpose processor. The system 120 includes an image generator 122 that obtains images of a subject of interest. For example, the image generator 122 can include one or more sensors that are configured to obtain an image of the subject. During image generation, the image or images from the one or more sensors can be preprocessed to increase the associated dynamic range of the images and to remove static background elements. In an exemplary embodiment, the image generator 122 can produce a stereo disparity map from the outputs of two or more sensors.

The output of the image generator 122 is provided to a virtual image generator 124 that generates virtual images from the output of the image generator 122. For example, the virtual image generator 124 can utilize the images from the image generator 122 and depth information from an associated stereo disparity map to produce at least one virtual image of the occupant from a desired perspective. For example, the image data can be used to generate a virtual side view image, containing depth information related to the imaged surface of the subject of interest and the background.

The virtual image is then provided to an object locator 126 that locates one or more candidate objects within the virtual images. In an exemplary implementation of the system in a head tracking algorithm the object locator identifies a largest grouping of continuous pixels within the generated image. For example, pixel groupings, or blobs, can be defined according to their associated intensity values or depth values. The largest blob is likely to be associated with a vehicle occupant. A plurality of peaks are then identified within the determined contour, with each of the peaks representing a potential head candidate. It will be appreciated, however, that the operation of the object locator 126 will vary depending on the nature of the object of interest.

The identified candidate objects are evaluated at an arbitrator 128. The arbitrator 128 evaluates the identified candidate objects according to a plurality of rules to determine which candidate object is most likely to represent the object of interest. For example, the arbitrator 128 can include a voting algorithm that assigns points to each candidate object according to associated characteristics of the object of interest and selects the candidate object having the greatest number of points as the object of interest. The located object of interest can be segmented from the image and provided to a classification system for classification. Alternatively, the determined location can be reported to a control system for an occupant protection system.

Figure 4:
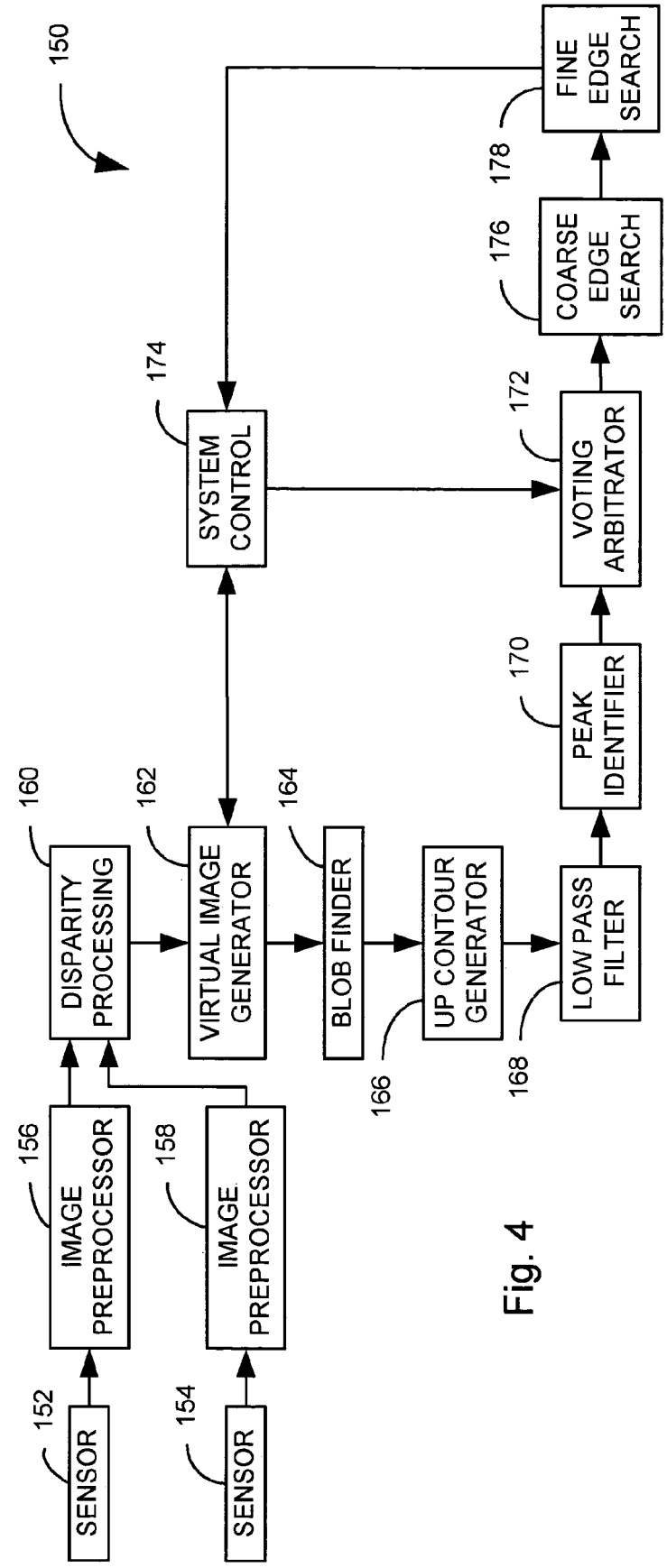
FIG. 4 illustrates a head tracking system for an actuatable occupant restraint system.

FIG. 4 illustrates an exemplary head tracking system for an actuatable occupant restraint system. The system 150 includes a plurality of image sensors 152 and 154, each of which is operative to produce a two-dimensional image of a desired subject. It will be appreciated that the sensors can be of any appropriate design for a given application and can image a subject from reflected infrared, ultraviolet, and other electromagnetic radiation as well as light within the human visible spectrum. The sensors 152 and 154 are spaced apart by a desired distance to enable the cameras to be used for stereo imaging.

The images output from the two sensors 152 and 154 are provided to respective image preprocessors 156 and 158. Each of the preprocessors (e.g., 156) processes a received image to improve the quality of the image and to remove undesired portions of the image. For example, a static background associated with the position of a given camera can be subtracted from the image to leave an image of the seat and its occupant. Other processing can be performed to eliminate obvious noise from the image and increase its dynamic range.

The preprocessed images are provided to a disparity processing component 160. The disparity processing component 160 combines corresponding images from the sensors to produce a stereo disparity map associated with the two or more sensors, as described above in FIG. 2. The stereo disparity map is then provided to virtual image generator 162, which generates virtual images from the disparity image and the output of the sensors 152 and 154. The virtual image generator 162 can utilize the images from the sensors 152 and 154 and the depth information from the stereo disparity map to produce a virtual image of the occupant from a desired perspective. For example, the sensor data can be used to generate a virtual side view image, containing depth information related to the imaged surface of the occupant, the seat, and the background of the occupant.

The virtual side view image of the occupant can be provided to a blob finder 164. The blob finder 164 locates a largest grouping of contiguous pixels within the side view image having depth values within a desired range. For example, the range can be set to an approximate depth of the occupant such that the background of the vehicle (e.g., the door and side columns) is excludes from the blob, but the occupant, the seat, and any other objects in the immediate vicinity of the seat are included in the blob. The determined blob is then provided to an up contour generator 166. The up contour generator 166 produces a contour of the upper edge of the blob, comprising the uppermost pixel of each of a plurality of columns comprising the blob.

The generated up contour is provided to a low pass filter 168 that smoothes the contour according to an associated filter width. For example, the filter width can be calculated as the average width of an adult human head (e.g., 150 mm) divided by a scaling factor that is based on the width of the image. The filtered image is then provided to a peak identifier 170 that finds a plurality of peaks within the contour that serve as head candidates. Pixels that represent local maximums in height can be selected according to an associated selection algorithm. For example, peaks that do not have a desired shape (e.g., that exceed a threshold value of the width or height), can be excluded from the analysis. These peaks serve as head candidates for the head location algorithm.

The determined peaks are provided to a voting arbitrator 172. The voting arbitrator 172 assigns points to the various peaks according to associated characteristics of the image in the region of the peaks. For example, points can be assigned according to the height of the peak, its position in relation to the centroid of the blob, its depth (e.g., width in a front view perspective), its perceived solidity (e.g., amount of the disparity image filled), and the smoothness of its trajectory, as determined according to data from previously selected peaks provided from a system control 174. It will be appreciated that negative points can be assigned to the peaks for characteristics that indicate that the peak is not the occupant's head. The peak receiving the most points is selected as a rough location for the occupant's head.

This rough location is provided to a coarse edge search component 176. The coarse edge search attempts to locate the front edge of the occupant's head. For example, the edge can be detected via an edge detection algorithm, such as the Canny or Sobel edge detection algorithms. For example, a range of 150 mm. can be established below the peak and the area forward of this range can be scanned for an edge. An edge can be defined as a point in which the intensity of the image changes by more than fifty percent for more than two consecutive pixels. Once the edge is located, the determined location is provided to a fine edge search component 178. The fine edge search 178 searches a region defined by the coarse edge search via a progressive edge search. Each time the search region is refined, a higher resolution virtual image can be retrieved from the virtual image generator 162. The refined image is then searched again, until an edge has been located to a desired degree of accuracy. The depth position of the edge can then be determined according to the average disparity across the determined edge.

Figure 5:
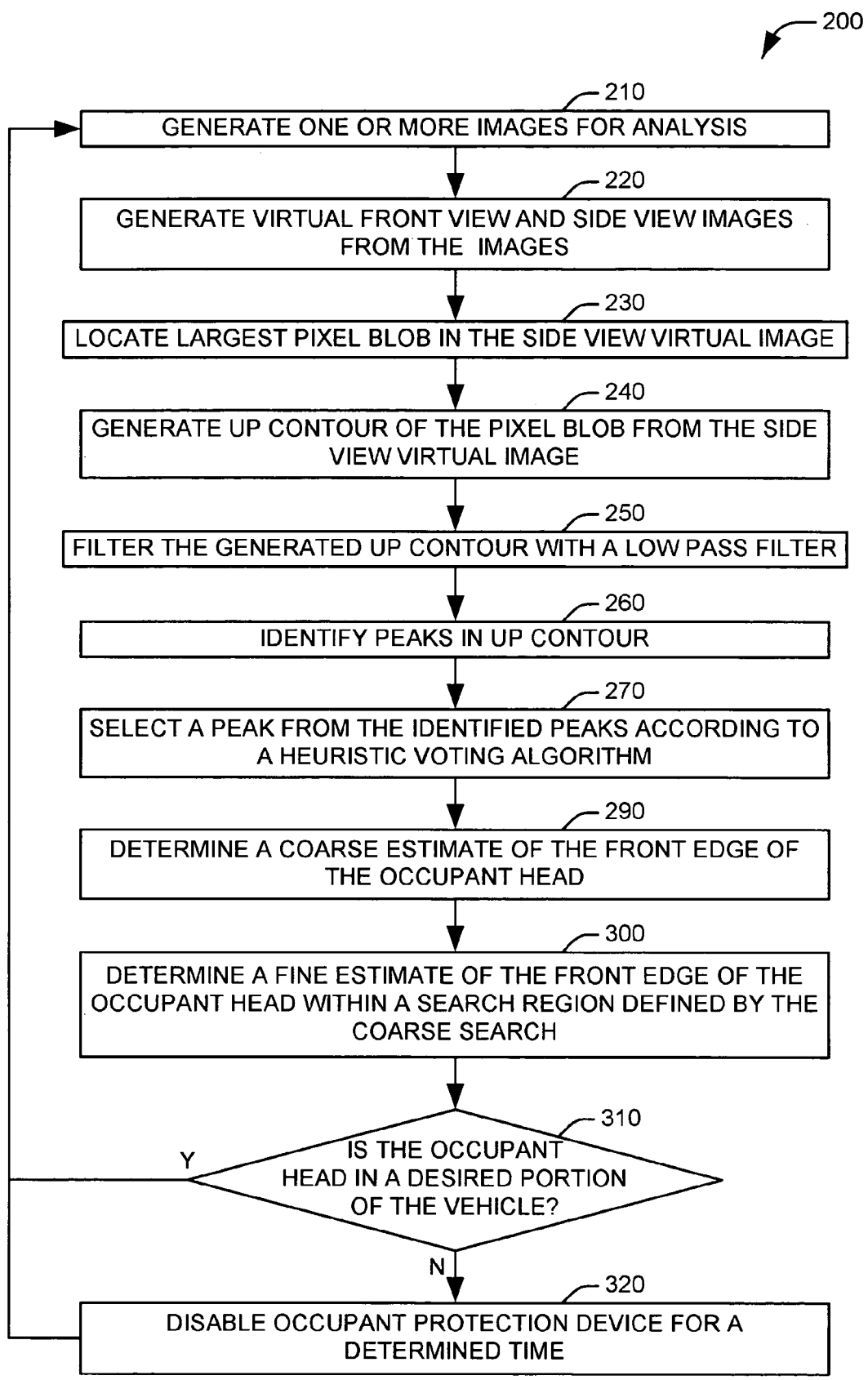
FIG. 5 illustrates a methodology for tracking the head of an occupant to control an occupant protection system.

FIG. 5 illustrates a methodology 200 for tracking the head of an occupant to control an occupant protection system. The methodology begins at step 210, where a plurality of images are generated for analysis. For example, images of a vehicle occupant can be generated from a plurality of cameras configured to image the occupant from different angles. Virtual images, representing a front view (e.g., a view from the front of the vehicle), and a side view of the occupant can then be generated from the images at step 220. The generation of the virtual image is discussed in further detail in FIG. 6 below.

At step 230, a largest blob of contiguous pixels within the side view virtual image is identified. At step 240, an up contour is generated representing the blob. The up contour can comprise the uppermost pixel of each column of pixels comprising the blob. The up contour is then filtered at step 250, using a low pass filter having a width approximately equal to the expected width of a human within the image.

This has the effect of smoothing smaller peaks, leaving peaks that are approximately the expected size of a human head. The remaining peaks within the contour are then identified as potential head candidates at step 260.

At step 270, the identified peaks are evaluated according to a heuristic voting algorithm and one of the plurality of peaks are selected as a head candidate. The heuristic voting algorithm assigns points to the peaks according to associated characteristics of the peaks, and selects the peak receiving the greatest number of points. An exemplary heuristic voting algorithm is described in detail in FIG. 7. The region of the image around the selected peak is then searched at step 290 to determine the position of the front edge of the head. The search region extends vertically downward from the point of the peak by an expected distance for the height of the head (e.g., six inches). The area forward of the peak (e.g., toward the front of the vehicle) is then searched to determine an edge of the occupant's head. An edge can be defined as a point in which the intensity of the image changes by more than fifty percent for more than two consecutive pixels.

Once an edge is determined, a fine search is conducted in the region of the determined edge at step 300. The search region is three-dimensional and extends around the coarse edge. The fine search is iterative, such that each time an edge is determined, a higher resolution virtual image can be generated to allow for a more refined edge location. The edge location gives the position of the head within the plane of the image. The depth of the head can be determined according to the average disparity across the determined edge.

At step 310, it is determined if the occupant's head is within a region of the vehicle interior in which it is desirable to actuate the occupant protection system in the event of a crash. If not (N), the occupant protection system is disabled for a brief time at step 320, for example, until the next iteration of the head tracking methodology 200. It will be appreciated that the head tracking methodology 200 can be performed in real time, such that the time in which the protection device is disabled can be minimized. The methodology 200 then returns to step 210 to determine an updated head location. If the head is within the desired region (Y), the methodology 200 returns directly to step 210.

Figure 6:
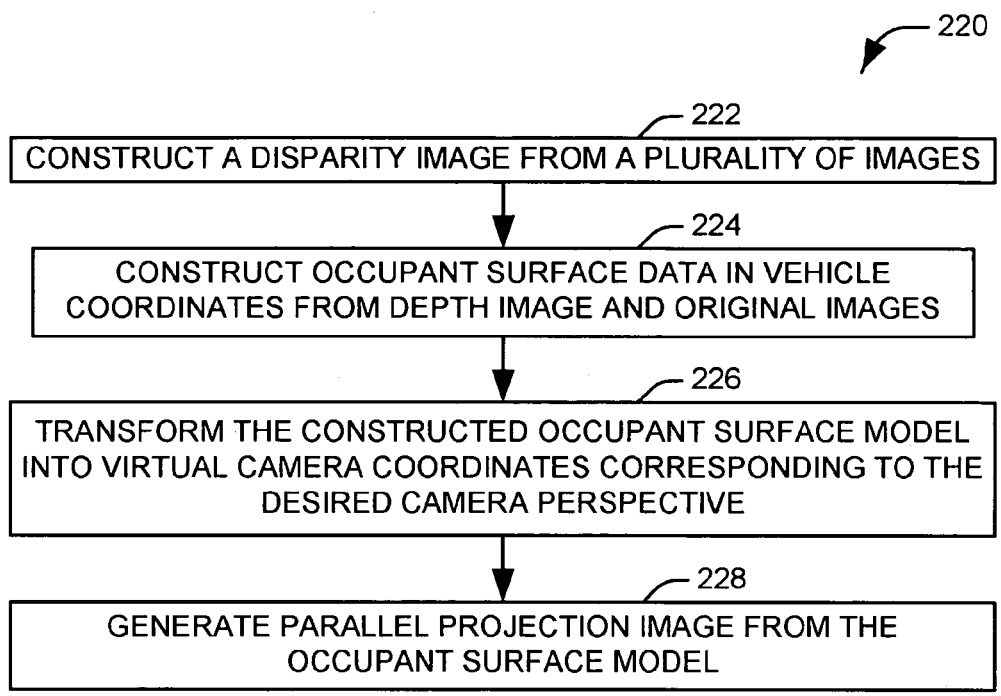
FIG. 6 illustrates a methodology for generating a virtual image of a vehicle occupant from a plurality of images.

FIG. 6 illustrates a methodology 220 for generating a virtual image of a vehicle occupant from a plurality of images. For example, virtual images simulating a front view perspective and a side view perspective can be generated for the head tracking algorithm. The methodology begins at step 222, where a disparity image is generated from a set of the plurality of images. A method for producing disparity images is described in further detail in FIG. 2 above. The data in the disparity image is generated in coordinates associated with a camera used to obtain one of its plurality of constituent images. In an exemplary implementation, the camera coordinates represent a left-handed coordinate system, where the x-axis is horizontal and positive toward the right side of image, the y-axis is vertical and positive toward the top of the image, and the z-axis is normal to the image, aligned toward the region of interest.

The methodology 220 then advances to step 224, where a surface model of the occupant is constructed in vehicle coordinates from the depth image and its constituent images. This can be accomplished by translating the image data into a predefined vehicle coordinate system. In an exemplary implementation, the coordinate system is right-handed, with the x-axis horizontal and positive toward the vehicle rear, the y-axis horizontal and toward the passenger side of the vehicle, and the z-axis vertical and positive toward the roof of the vehicle. For example, the image can be rotated into the other coordinate system via a pixel-by-pixel multiplication of the image by a transformation matrix selected to rotate between the known camera coordinate system and the predefined vehicle coordinate system. The transformation can include one or more correction coefficients to compensate for lens distortion and nonorthonormal error.

The methodology 220 then advances to step 226, where the surface model is translated from vehicle coordinates into a virtual camera coordinate systems associated with a desired perspective. This transformation matrix can be determined according to the desired perspective. It will be appreciated that the two transformation steps (224 and 226) can be combined into a single transformation matrix to conserve processing resources.

In accordance with an aspect of the present invention, a specialized mapping pattern can be utilized to maintain the integrity of the image data during the transformation. For example, some pixels from the model can shift position as to overlap or separate from connected pixels. This problem is exacerbated when the image model is formed from relatively low resolution disparity data. When the disparity data is taken from a concave object (e.g., a human head or torso), the data should be smooth and continuous in all three dimensions and should remain so from any given perspective. Accordingly, a given pixel from the occupant surface model can be mapped to a pattern of multiple pixels in the new perspective to generate a smoother and more complete image. Exemplary patterns include a four or more pixel zigzag pattern (e.g., a series of offset lines of the same width), and a four or nine pixel square pattern. It will be appreciated that a mapping pattern can be selected according to the desired perspective of the virtual image. For example, the zigzag pattern has been determined to be effective in generating the side view image, while the square patterns have been found to be especially effective for generating a front view image of the occupant.

The methodology then advances to step 228, where the surface model is projected into a parallel virtual camera plane associated with a desired virtual camera position. For example, a virtual camera image from a front view of the occupant can be determined by projecting the model data representing the front of the occupant onto a predefined plane normal to the x-axis in the vehicle coordinates. Similarly, a virtual camera image representing a side view of the occupant can be determined by projecting the model data representing the side of the occupant onto a predefined plane normal to the y-axis in the vehicle coordinates.

Figure 7:
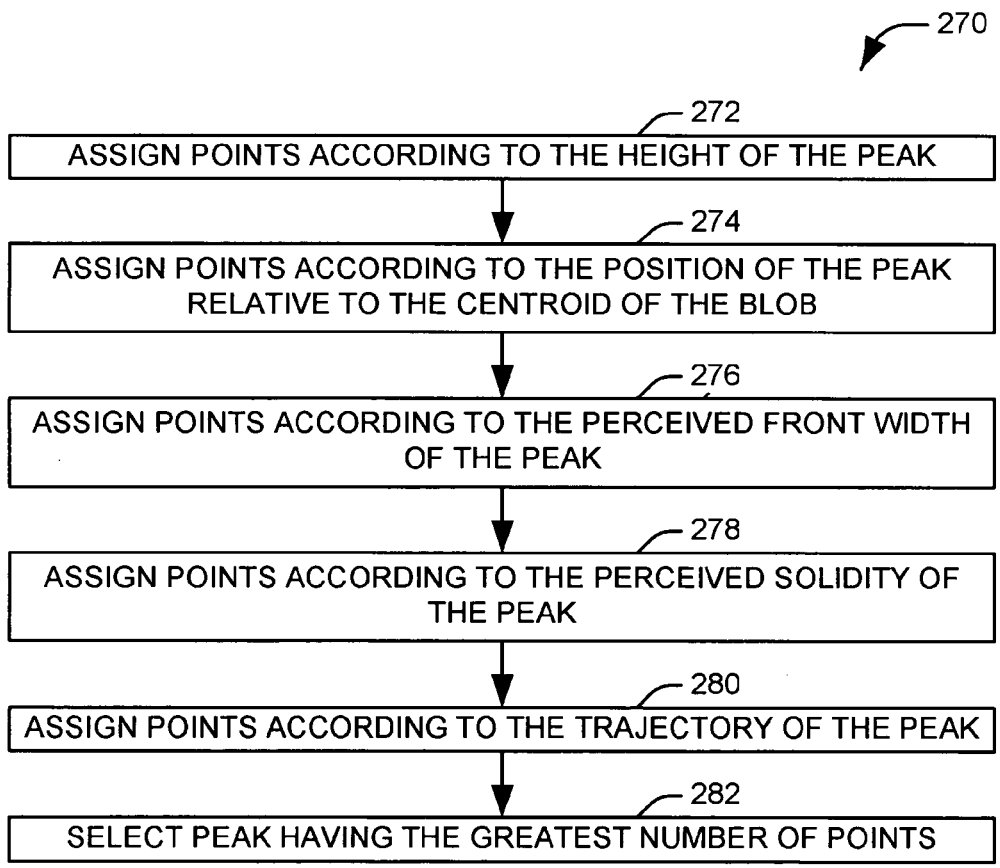
FIG. 7 illustrates a methodology for selecting between a plurality of head candidate peaks in accordance with an aspect of the present invention.

FIG. 7 illustrates an exemplary methodology 270 for selecting between a plurality of head candidate peaks in accordance with an aspect of the present invention. The methodology 270 begins at step 272, where a plurality of points are assigned to each peak according to the associated height of the peak. For example, the ratio of the height of the peak above a minimum threshold to a determined maximum height range can be determined and multiplied by one-hundred to obtain a point value for each peak. Accordingly, each peak can receive between zero to one hundred points based on its height relative to the threshold height.

The methodology 270 then proceeds to step 274, where points are assigned to the peaks according to their position relative to the centroid of the grouping of pixels comprising the peaks. For example, the peak whose width encompasses the centroid can be assigned fifty points. The methodology 270 then advances to step 276, where points are assigned to the peaks according to the determined front view width of the peak. For example, a front view of the occupant can be produced at the virtual image generator and a portion of the front view image corresponding to each peak can be determined. A width of each peak can be determined from the front view image and compared to a normal range of widths from adult human heads (e.g., 100-200 mm.). Any peaks having a front view width within the range of normal front view head widths can be assigned fifty points.

The methodology 270 then advances to step 278, where points are assigned to the peaks according to their solidity. The solidity of a given peak can be determined according to the proportion of the side view blob that is filled in the generated side view disparity image. For example, the peak having the largest proportion of the side view blob filled can be assigned fifty points. The methodology 270 then advances to step 280, where points are assigned as to reward a smoothness in the trajectory of the head between iterations. For example, the head candidate closest to the previous head candidate can be awarded fifty points. The methodology then advances to step 282, where the peak having the largest total number of points is selected as the head candidate.

It will be appreciated that the above methodology is exemplary and the individual rules and point allocations can vary. In short, a guiding principle of the exemplary voting arbitration methodology is that the rules should award points to object resembling a human head, and detract points from objects that resemble other common objects within the environment of interest (e.g., a vehicle interior). A nonexhaustive list of other rules that can be applied can include awarding points according to a comparison of the spread of the head peak to a threshold range, awarding or subtracting points a comparison of the steepness (e.g., rate of decline) of the head peak to threshold minimum and maximum values, subtracting points according to the size of the front edge of the head peak, and awarding points according to the position of the head peak relative to a candidate shoulder of the occupant. One skilled in the art will recognize other such rules that can be used in discriminating a human head within an image from a plurality of head-like objects within the image.

Figure 8:
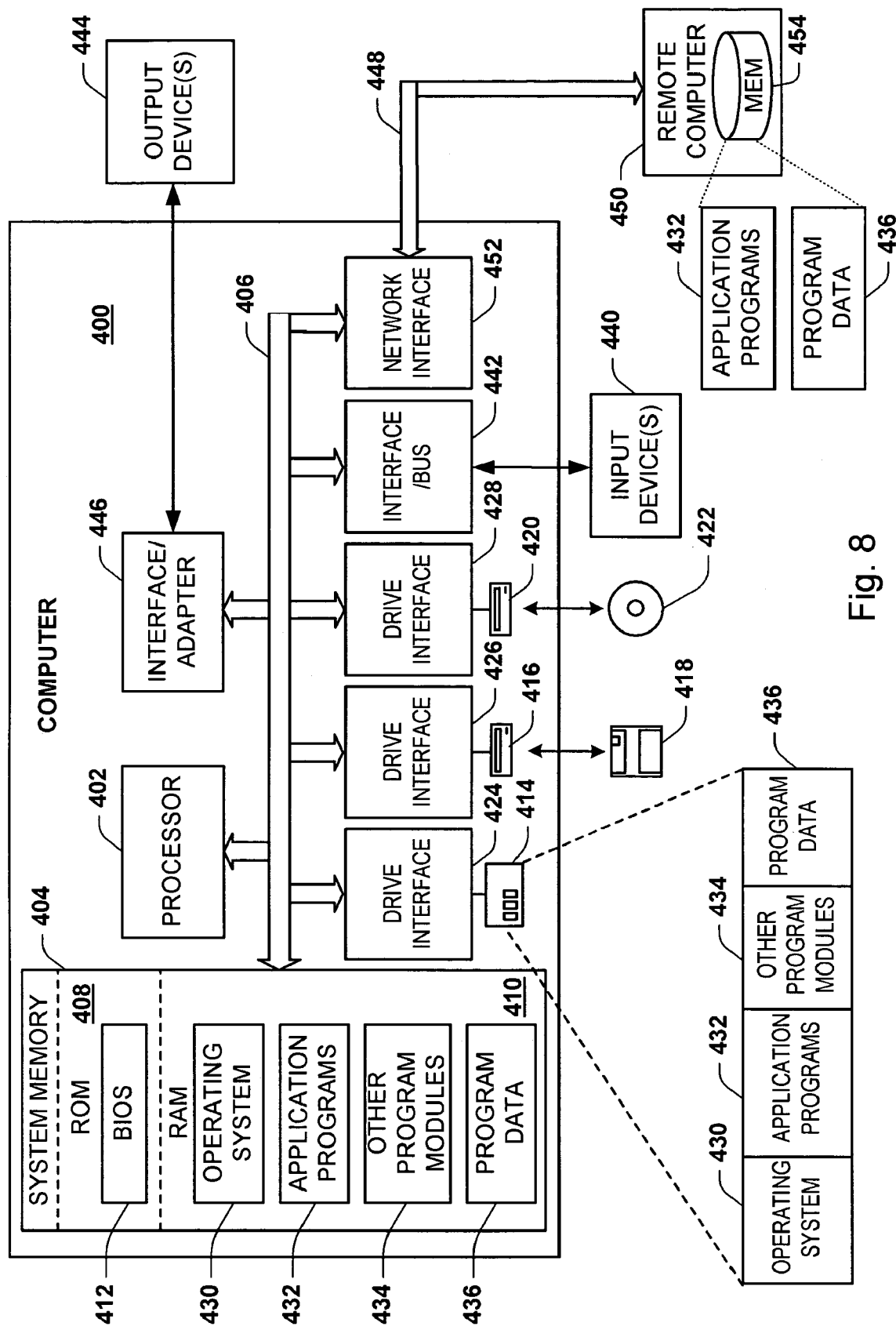
FIG. 8 illustrates a computer system that can be employed to implement systems and methods described herein, such as based on computer executable instructions running on the computer system.

FIG. 8 illustrates a computer system 400 that can be employed to implement systems and methods described herein, such as based on computer executable instructions running on the computer system. The computer system 400 can be implemented on one or more general purpose networked computer systems, embedded computer systems, routers, switches, server devices, client devices, various intermediate devices/nodes and/or stand alone computer systems. Additionally, the computer system 400 can be implemented as part of the computer-aided engineering (CAE) tool running computer executable instructions to perform a method as described herein.

The computer system 400 includes a processor 402 and a system memory 404. A system bus 406 couples various system components, including the system memory 404 to the processor 402. Dual microprocessors and other multi-processor architectures can also be utilized as the processor 402. The system bus 406 can be implemented as any of several types of bus structures, including a memory bus or memory controller, a peripheral bus, and a local bus using any of a variety of bus architectures. The system memory 404 includes read only memory (ROM) 408 and random access memory (RAM) 410. A basic input/output system (BIOS) 412 can reside in the ROM 408, generally containing the basic routines that help to transfer information between elements within the computer system 400, such as a reset or power-up.

The computer system 400 can include a hard disk drive 414, a magnetic disk drive 416 (e.g., to read from or write to a removable disk 418) and an optical disk drive 420 (e.g., for reading a CD-ROM or DVD disk 422 or to read from or write to other optical media). The hard disk drive 414, magnetic disk drive 416, and optical disk drive 420 are connected to the system bus 406 by a hard disk drive interface 424, a magnetic disk drive interface 426, and an optical drive interface 434, respectively. The drives and their associated computer-readable media provide nonvolatile storage of data, data structures, and computer-executable instructions for the computer system 400. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 410, including an operating system 430, one or more application programs 432, other program modules 434, and program data 436.

A user may enter commands and information into the computer system 400 through user input device 440, such as a keyboard, a pointing device (e.g., a mouse). Other input devices may include a microphone, a joystick, a game pad, a scanner, a touch screen, or the like. These and other input devices are often connected to the processor 402 through a corresponding interface or bus 442 that is coupled to the system bus 406. Such input devices can alternatively be connected to the system bus 406 by other interfaces, such as a parallel port, a serial port or a universal serial bus (USB). One or more output device(s) 444, such as a visual display device or printer, can also be connected to the system bus 406 via an interface or adapter 446.

The computer system 400 may operate in a networked environment using logical connections 448 to one or more remote computers 450. The remote computer 448 may be a workstation, a computer system, a router, a peer device or other common network node, and typically includes many or all of the elements described relative to the computer system 400. The logical connections 448 can include a local area network (LAN) and a wide area network (WAN).

When used in a LAN networking environment, the computer system 400 can be connected to a local network through a network interface 452. When used in a WAN networking environment, the computer system 400 can include a modem (not shown), or can be connected to a communications server via a LAN. In a networked environment, application programs 432 and program data 436 depicted relative to the computer system 400, or portions thereof, may be stored in memory 454 of the remote computer 450.

From the above description of the invention, those skilled in the art will perceive improvements, changes, and modifications. Such improvements, changes, and modifications within the skill of the art are intended to be covered by the appended claims.

Having described the invention, the following is claimed:

1. A system for controlling an actuatable occupant protection system comprising:
   an image generator that generates at least two images of a vehicle occupant;
   a virtual image generator that produces a virtual side view image of the vehicle occupant from the generated images;

a blob finder that selects a largest grouping of pixels in the virtual side view image;

a peak identifier that locates a plurality of peaks along the uppermost contour of the selected grouping of pixels; and an arbitrator that selects one of the plurality of peaks according to determined characteristics of the peaks.

2. The system of claim 1, further comprising a contour generator that locates the uppermost contour of the largest grouping of pixels.

3. The system of claim 2, further comprising a low pass filter that smoothes the located uppermost contour, the low pass filter having a width approximating the expected width of an adult human head within the image.

4. The system of claim 1, further comprising a coarse edge search component that locates a frontward edge associated with the selected peak.

5. The system of claim 4, further comprising a fine edge search component that iteratively refines the location of the front edge until a desired degree of accuracy is achieved.

6. The system of claim 1, further comprising a disparity processing component that generates a stereo disparity map from the at least two images, the virtual image generator using the stereo disparity map to generate the virtual side view image.

7. The system of claim 1, further comprising an occupant protection system control that controls the actuation of the occupant protection system according to a location associated with the selected peak.

8. A computer program product, implemented in a computer readable medium and operative in a data processing system, controlling an actuatable occupant protection system, comprising:

a virtual image generator that translates image data from a plurality of images to produce a virtual side view image of the vehicle interior;

a blob finder that identifies a largest grouping of pixels in the side view image;

a contour generator that identifies an uppermost contour of the largest grouping of pixels;

a peak identifier that locates peaks within the contour; and a voting arbitrator that analyzes the contour peaks according to a heuristic voting algorithm to identify a peak location associated with the head of the vehicle occupant.

9. The computer program product of claim 8, further comprising a disparity processing component that generates a stereo disparity map from the at least two images, the virtual image generator using the stereo disparity map to generate the virtual side view image.

10. The computer program product of claim 8, further comprising a system control that controls the actuation of the occupant protection system according to a location associated with the identified peak location.

11. The computer program product of claim 8, further comprising a coarse edge search component that locates a frontward edge associated with the identified peak location.

12. The computer program product of claim 11, further comprising a fine edge search component that interatively refines the location of the front edge until a desired degree of accuracy is achieved.

* * * * *